United States Patent
Han

(10) Patent No.: US 6,483,423 B1
(45) Date of Patent: Nov. 19, 2002

(54) VEHICLE-USE COOLING FAN DRIVING APPARATUS PROVIDED WITH A TROUBLE SENSING FUNCTION

(75) Inventor: Sung-Kuk Han, Seoul (KR)

(73) Assignee: Siemens VDO Halla Ltd., Chungchongbuk-do (KR)

( * ) Notice: Subject to any disclaimer, the term of this patent is extended or adjusted under 35 U.S.C. 154(b) by 0 days.

(21) Appl. No.: 09/427,842

(22) Filed: Oct. 26, 1999

(30) Foreign Application Priority Data

Jul. 15, 1999 (KR) ............................. 99-28677

(51) Int. Cl.[7] ............................................... G05B 23/02
(52) U.S. Cl. ................. 340/3.1; 123/406.65; 310/68 R; 416/169 A; 165/263; 180/271
(58) Field of Search ............................. 340/3.1; 701/29, 701/34; 416/169 A; 165/204, 263; 310/68 R; 123/406.65; 318/254; 417/356; 180/271

(56) References Cited

U.S. PATENT DOCUMENTS 4,408,278 A * 10/1983 Saito et al. ................. 165/204
4,459,087 A * 7/1984 Barge .......................... 417/356
4,584,978 A * 4/1986 Sasaki et al. ........... 123/406.65
5,099,181 A * 3/1992 Hsu ............................. 318/254

* cited by examiner

Primary Examiner—Brian Zimmerman
Assistant Examiner—Yves Dalencourt
(74) Attorney, Agent, or Firm—R. Neil Sudol; William Sapone; Henry Coleman

(57) ABSTRACT

In a vehicle-use cooling fan driving apparatus, a circuit is connected to a drain terminal of a driver transistor in order to sense a current of two motors which are connected in parallel. The circuit amplifies voltages of the terminal and source terminal of the driver transistor by the amount of the forward voltage of a diode. A power source is provided for supplying a current in order to amplify a voltage by the amount of forward voltage of the diode. The transistor prevents the amplified signal from being input to a microcomputer during an off-period of the transistor. A trouble-sensor compares the current value of the motors with a reference value with respect to a corresponding pulse width modulated signal so that trouble occurring in either of the two motors can be sensed so as to prevent an overheating of the motors.

4 Claims, 6 Drawing Sheets

VEHICLE-USE COOLING FAN DRIVING APPARATUS PROVIDED WITH A TROUBLE SENSING FUNCTION

BACKGROUND OF THE INVENTION

1. Field of the Invention

The present invention relates to a pulse width modulation (PWM), and more particularly, to a vehicle-use cooling fan driving apparatus provided with a trouble sensing function for sensing constraint or a short when a problem occurs in two motors having a large capacity difference between them and which are connected in parallel and driven in PWM method.

2. Description of the Related Art

A conventional vehicle-use cooling fan control device 1, as shown in FIG. 1, has one end portion thereof an engine control unit 50 and a battery B, and the other end portion thereof a radiator motor 10 and a condenser motor 11.

Control device 1 is made up of a microcomputer 2 for receiving a motor rotation signal from engine control unit 50 and converting the received signal to a pulse width modulated signal, a driver transistor 3 for receiving the pulse width modulated signal from microcomputer 2 and driving two motors 10 and 11, a resistance 4 connected to a source of driver transistor 3 and which senses a current, and a comparator 5 for comparing the current sensed by resistance 4 with a reference voltage.

In thus-structured vehicle-use cooling fan driving apparatus, engine control unit 50 senses temperature of water coolant, operating state of air conditioner, and speed of vehicle and transmits an appropriate rotation speed of the cooling fan to control device 1. Subsequently, microcomputer 2 of control device 1 senses the rotation speed, and applies a control signal obtained by pulse width modulating a specific frequency to a gate terminal of motor driver transistor 3.

Thus, a current is applied to a radiator motor 10 and a condenser motor 11 as driver transistor 3 is turned on/off, thereby rotating motors 10 and 11 at a specific rotation speed.

At this time, the amount of current applied is determined by a ratio (D) of pulse width to a pulse cycle, applied from microcomputer 2 to the gate terminal of driver transistor 3.

The current which passes from battery B to motors 10 and 11 flows to a source terminal via the drain terminal of driver transistor 3, and flows again to a ground terminal via resistor 4.

Here, comparator 5 compares the size of the voltage generated from current sensing resistance 4 with a reference voltage, and decreases pulse width applied to the gate terminal of driver transistor 3 by a specific ratio (Δ D) when the size of the voltage generated from current sensing resistance 4 exceeds the reference voltage. Comparator 5 controls pulse width by repeatedly performing the above-described operation, thus preventing a current exceeding a predetermined value from being applied to motors 10 and 11.

However, in such a conventional method, size of current sensing resistance 4 increases in proportion to the total size of the maximum allowable current of motors 10 and 11, thereby causing a significant constraint on the total size of control device 1. In addition, an error may be caused when the amount of current applied to the motor is measured, since resistance value varies depending on heat generation of resistance 4.

Further, if the control device is mounted onto an electronic substrate, it is required that a special lead endurable for a high temperature has to be employed instead of a common lead when soldering, thereby causing a cost increase and a complicated process.

In a common vehicle, a radiator motor and a condenser motor have difference in capacity thereof (the radiator motor has a capacity approximately two times larger than the condenser motor). At a specific frequency of noise generated from a motor operation when the same motors are used, the two motors may interfere with each other, thereby causing a noise from a resonance. To avoid this, the radiator motor for cooling the coolant water of engine is larger than the condenser motor for cooling the refrigerant of air conditioner.

Meanwhile, as shown in FIG. 2, in a conventional method, when a pulse applied to the gate terminal of driver transistor 3 is turned on, the current flowing at current sensing resistance 4 is compared with a reference value. If the current flowing at current sensing resistance 4 is larger than the reference value, pulse width is decreased so as to be applied to the gate terminal. If the motor rotation speed is lower than the maximum speed, a current at the state where either of two motors is constrained does not flow exceedingly the reference current and is not sensed. Thus, a current keeps flowing to the constrained motor, and the motor is over-heated, which may cause a fire.

When the cooling efficiency is higher as winter times, number of times of motor rotation may not reach the maximum number of rotation. At this time, a current keeps flowing to the constrained motor, which causes an overheating of the motor.

Referring to FIG. 3, reference current (IREF) is determined within a range larger than the sum of stationary current of radiator (IRN) and stationary current of condenser (ICN) and smaller than the sum of constraint current of condenser (ICL) and stationary current of radiator (IRN).

Such a conventional method has a problem in that the abnormal current may not be sensed when the speed of motor is lower than the maximum rotation speed.

SUMMARY OF THE INVENTION

Therefore, it is an object of the present invention to provide a vehicle-use cooling fan driving apparatus adapting a pulse width modulation method (PWM) in which two fan motors are driven in parallel and a trouble of motor is sensed so as to enhance a stability of vehicle.

BRIEF DESCRIPTION OF THE DRAWINGS

The present invention will become more fully understood from the detailed description given hereinafter accompanying drawings, which are given by way of illustration only, and thus are not limitative of the present invention, and wherein.

PREFERRED EMBODIMENTS OF THE PRESENT INVENTION

The present invention will be explained in more detail with reference to the attached drawings.

Figure 1:
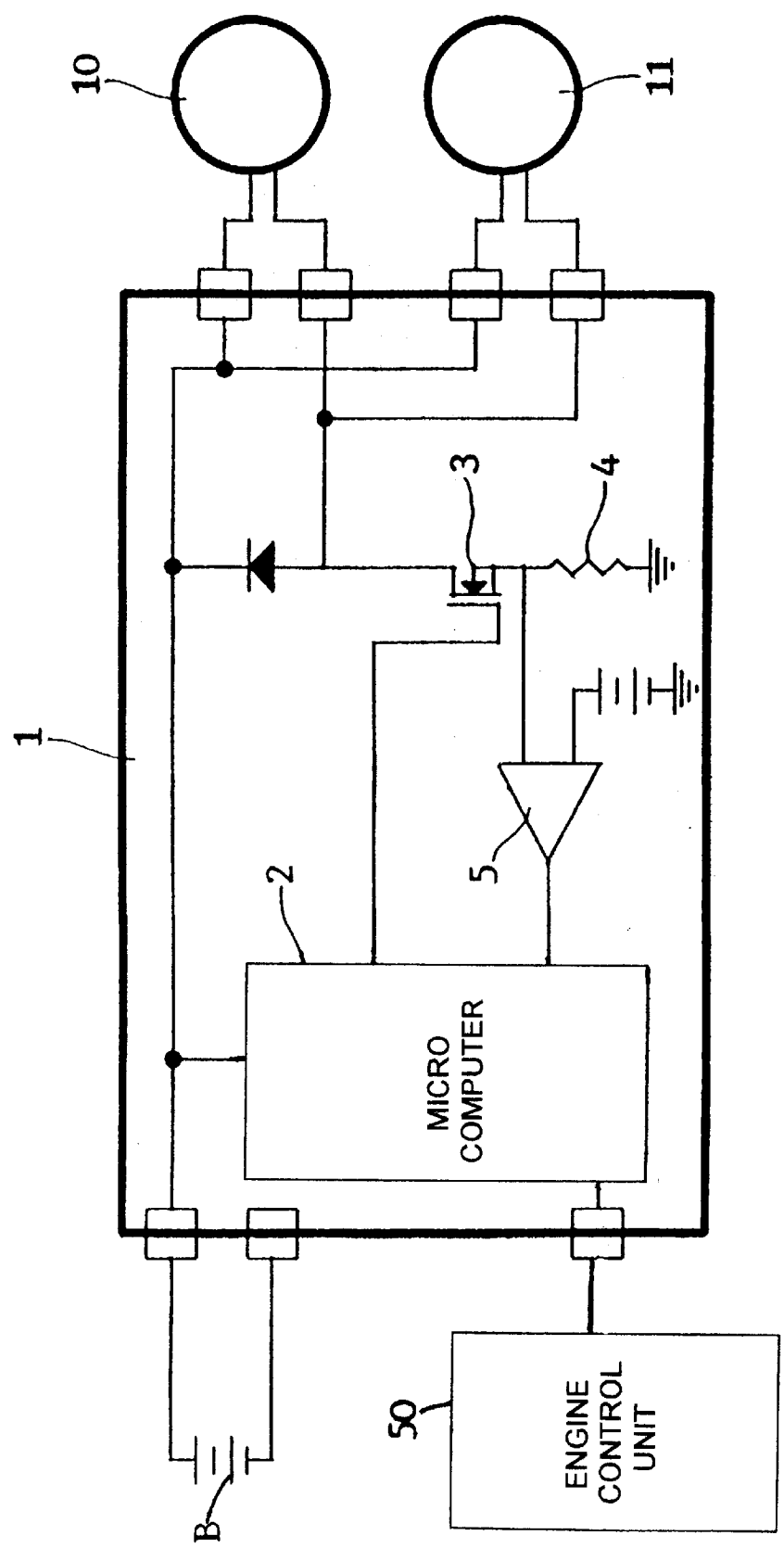
FIG. 1 is a circuit view of a conventional control device.
Figure 2:
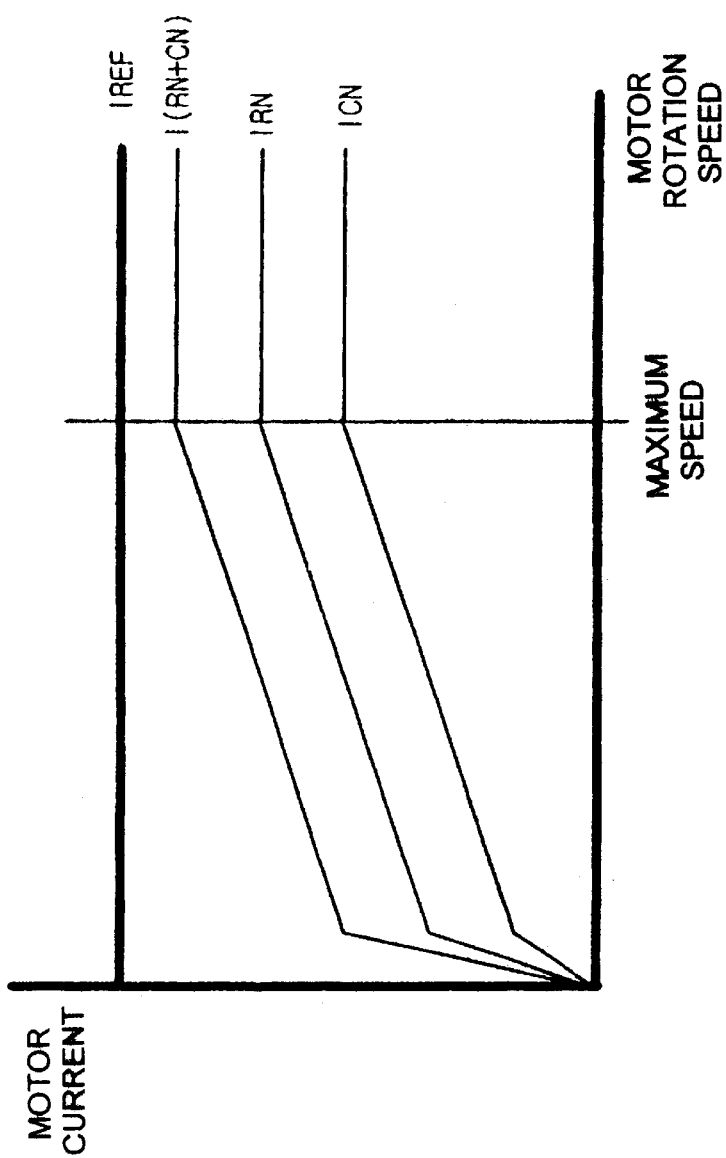
FIG. 2 is a graphical representation showing a change in current according to a rotation speed of a conventional motor.
Figure 3:
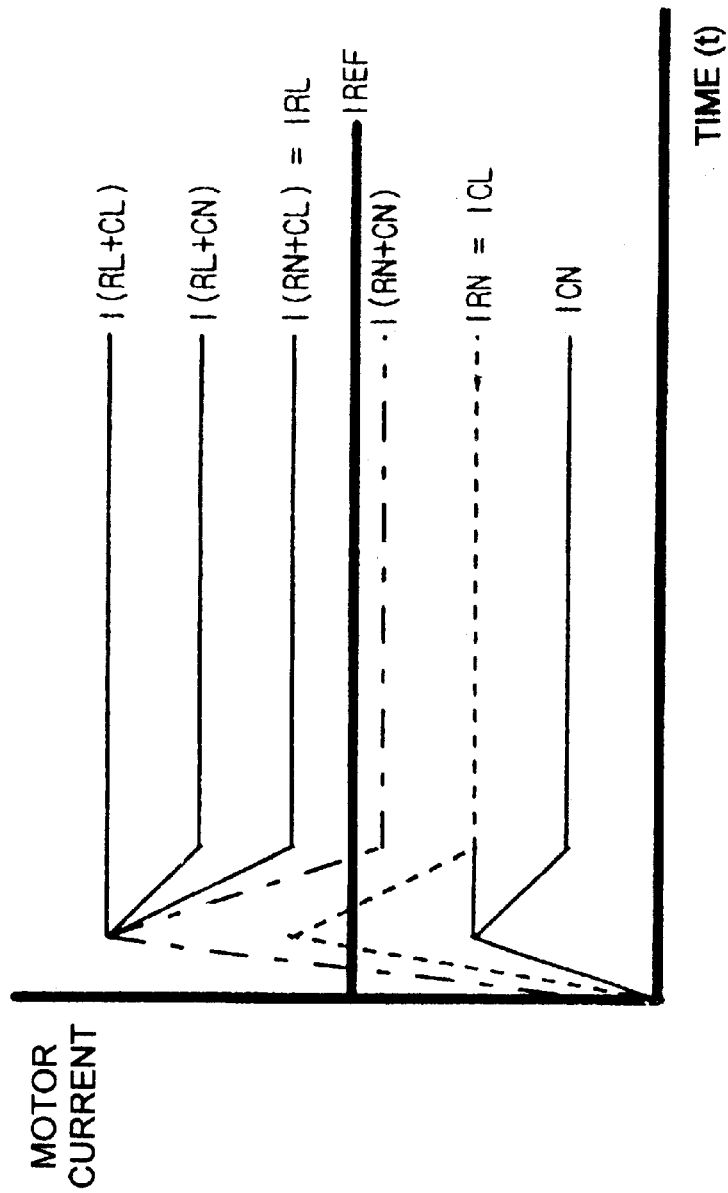
FIG. 3 is a graphical representation showing an establishment of reference current with respect to the current applied to a conventional motor.
Figure 4:
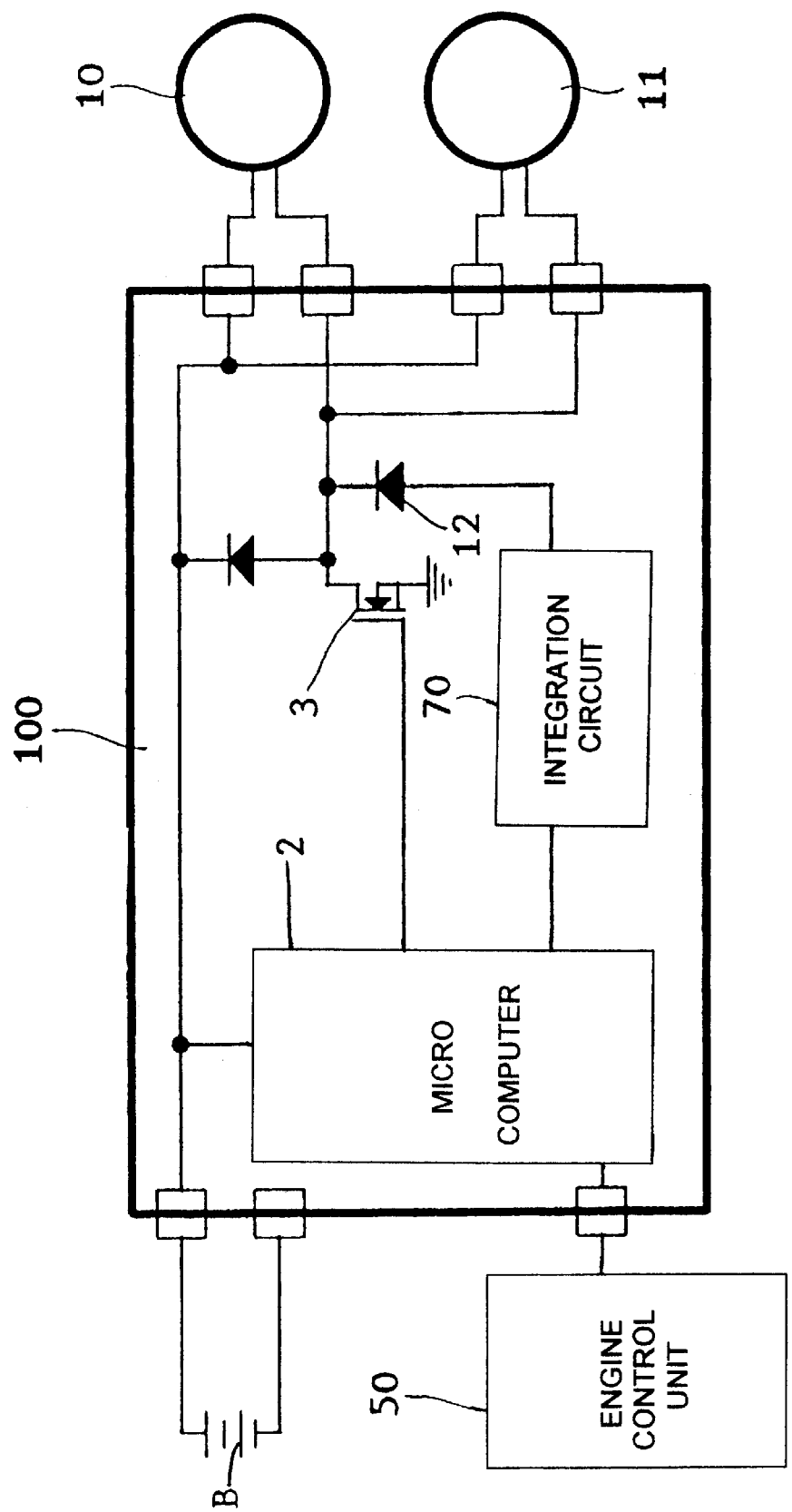
FIG. 4 is a circuit view of the present invention.

Referring to FIG. 4, a control device 100 has one end portion thereof engine control unit 50 and a battery B, and the other end portion thereof radiator motor 10 and condenser motor 11, similarly to the above-described conventional structure.

Control device 100 consists of microcomputer 2 for receiving a motor rotation signal from engine control unit 50 and converting the received signal to a pulse width modulated signal, driver transistor 3 for receiving the pulse width modulated signal from microcomputer 2 and driving two motors 10 and 11, a diode connected to the drain of driver transistor 3, and a voltage integration circuit 70 connected between diode 12 and microcomputer 2 and which integrates an output signal of microcomputer 2.

Figure 5:
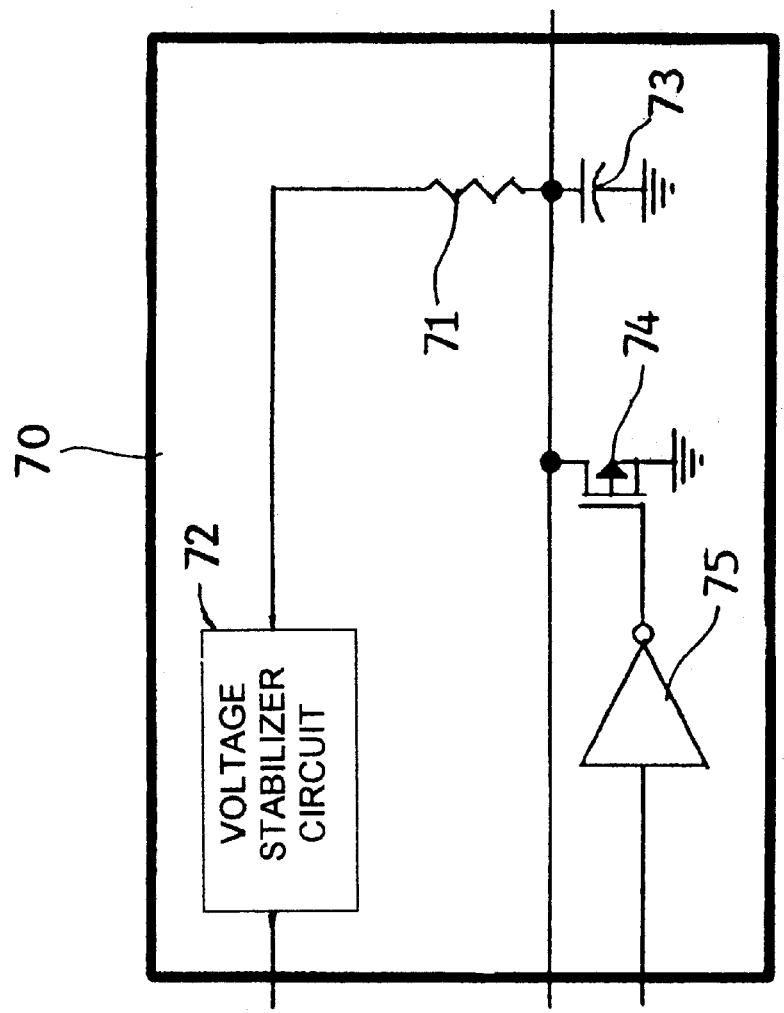
FIG. 5 is a integration circuit view of the present invention.

FIG. 5 is a detailed view of voltage integration circuit 70, and is made up of a voltage stabilizer circuit 72, a resistance 71 and a condenser 73 connected to voltage stabilizer circuit 72 and which eliminate a noise of a signal input from an input terminal, a transistor 74 for switching the signal passed through condenser 73, and an inverter 75 for inverting a gate signal of driver transistor 3.

Thus-structured present invention operates as follows.

Figure 6:
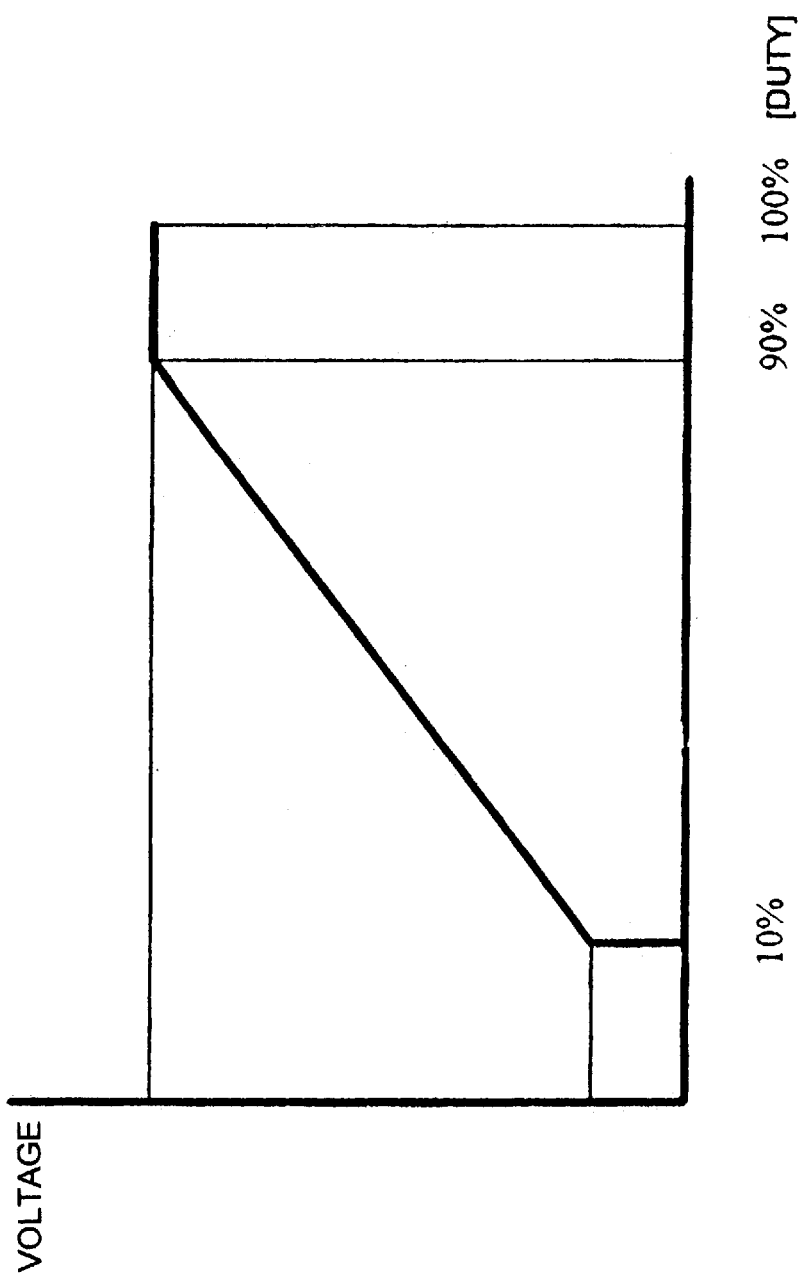
FIG. 6 is a graphical representation showing a duty/voltage conversion of input signal according to the present invention.

The rotation speed signal of the motor input from engine control unit 50 is transmitted as a duty signal having a predetermined frequency. Such a duty signal is converted to a voltage value proportional to the duty rate, as shown in FIG. 6, so that microcomputer 2 interprets the duty signal to a digital signal.

Minimum value of the duty signal input from engine control unit 50 is defined as a signal ranging from 10% to 90% so as to sense a disconnection of a signal line.

According to such a definition of the minimum value of the duty signal, a signal input from engine control unit 50 is determined as a normal signal reception only when a signal between 10% to 90% is input from engine control unit 50 so as to sense a disconnection between the signal line and a source line or an earthing line.

If the input signal duty is below 10% or above 90%, it is determined that engine control unit 50 has a communication problem. To prevent the engine from being overheated, motors 10 and 11 are operated at maximum rotation speed so as to prevent overheating of the engine and allow drivers to take steps for the trouble.

Microcomputer 2 converts the voltage value to a digital signal, and converts again the digital signal to a gate signal pulse width of driver transistor 3.

A current is supplied to motors 10 and 11 during the time period corresponding to the pulse width of pulse signal, and the current flowing causes a voltage drop between a drain terminal and a source terminal of driver transistor 3.

Here, integration circuit 70 to which the gate signal of driver transistor 3 is input provides the gate terminal of transistor 74 of integration circuit 70 with the gate signal and the inverted signal. It is required that a current sensing signal may not be input to microcomputer 2 via integration circuit 70 while driver transistor 3 is turned off by the pulse signal. The current sensing signal is allowed to be input to microcomputer 2 only during the on-period of driver transistor 3.

Voltage between the drain terminal and the source terminal of driver transistor 3 is low, so that microcomputer 2 may not directly convert an analog signal to a digital signal. Therefore, voltage from voltage stabilizer circuit 72 of integration circuit 70 causes a forward voltage drop of diode 12 by applying the current limited via resistance 71 to diode 12 of FIG. 4.

Accordingly, the sum of the voltage between the drain terminal and the source terminal of driver transistor 3 and the forward voltage of diode 12 is filtered by a time constant at condenser 73 of integration circuit 70, and input to A/D converting terminal of microcomputer 2.

Thus-converted signal is converted again to the current of motor in accordance with a duty rate of the corresponding pulse width, and is compared with a reference current value according to a duty rate of a driving pulse width stored in RAM of microcomputer 2, to thereby determine the state of the motor.

As described above, the present invention is capable of sensing the abnormal current of the motor even when the motor is controlled to a range below the maximum number of rotation. Thus, when the motor is driven by a pulse width modulation method, constraint or shortage can be easily sensed when any trouble occurs in the motor. In addition, the current sensing resistance is not used and the resistance value variance caused by a heating of the resistance can be prevented, to thereby reduce an error of measurement of current. Further, a special high temperature soldering or an additional soldering method which is required when the resistance is used is eliminated. As a result, the space for mounting within the vehicle is reduced, thus allowing an easy manufacturing and cost reduction.

What is claimed is:

1. A control device for a vehicle-use cooling fan driving apparatus provided with a trouble sensing function, in which said control device has at one end thereof an engine control unit and a battery and at the other end thereof a radiator motor and a condenser motor, said control device comprising:

a microcomputer for receiving a motor rotation signal from said engine control unit and converting said motor rotation signal to a pulse width modulated signal;

a driver transistor for receiving said pulse width modulated signal from said microcomputer and driving said radiator motor and said condenser motor;

a diode connected to a drain of said driver transistor; and an integration circuit connected between said diode and said microcomputer and which integrates an output signal of said microcomputer.

2. The control device according to claim 1, wherein said integration circuit further comprises:

a voltage stabilizer circuit for providing a specific voltage;

a resistance and a condenser connected to said voltage stabilizer circuit and which eliminate noise of signal input;

a transistor for switching a signal passed through said condenser; and an inverter for inverting a gate signal of said driver transistor.

3. In a vehicle-use cooling fan driving apparatus provided with a trouble sensing function, in which a control device has at one end thereof an engine control unit and a battery and at the other end thereof a radiator motor and a condenser motor, a microcomputer for receiving a motor rotation signal from said engine control unit and converting said motor rotation signal to a pulse width modulated signal, a driver transistor for receiving said pulse width modulated signal from said microcomputer and driving said radiator motor and said condenser motor; the improvement comprising:

a diode connected to a drain of said driver transistor; and an integration circuit connected between said diode and said microcomputer and which integrates an output signal of said microcomputer.

4. The improvement according to claim 3, wherein said integration circuit includes:

a voltage stabilizer circuit for providing a specific voltage;

a resistance and a condenser which eliminate noise of signal input and are connected to said voltage stabilizer circuit;

a transistor for switching a signal passed through said condenser; and an inverter for inverting a gate signal of said driver transistor.

\* \* \* \* \*